United States Patent
DiLonardo et al.

(10) Patent No.: US 8,592,736 B2
(45) Date of Patent: Nov. 26, 2013

(54) MICROWAVE COOKING SYSTEM

(75) Inventors: Paul DiLonardo, Colonia, NJ (US);
Jorge Prats, RiverEdge, NJ (US)

(73) Assignee: Tristar Products, Inc., Fairfield, NJ (US)

( * ) Notice: Subject to any disclaimer, the term of this patent is extended or adjusted under 35 U.S.C. 154(b) by 1406 days.

(21) Appl. No.: 12/014,972

(22) Filed: Jan. 16, 2008

(65) Prior Publication Data
US 2009/0179029 A1   Jul. 16, 2009

(51) Int. Cl.
*H05B 6/80* (2006.01)
*H05B 6/64* (2006.01)
*A23L 1/01* (2006.01)

(52) U.S. Cl.
USPC .............................. 219/733; 219/735; 426/665

(58) Field of Classification Search
USPC ......... 219/733, 735, 700, 687, 689, 725, 726, 219/729, 731, 728; 426/665, 114, 234, 433, 426/510; 99/448
See application file for complete search history.

(56) References Cited

U.S. PATENT DOCUMENTS

| | | | |
|---|---|---|---|
| 4,532,397 A * | 7/1985 | McClelland | 219/733 |
| 6,952,000 B2 * | 10/2005 | Ohyama | 219/734 |
| 2009/0035433 A1 * | 2/2009 | France et al. | 426/510 |
| 2009/0078125 A1 * | 3/2009 | Pawlick et al. | 99/448 |

* cited by examiner

*Primary Examiner* — Quang Van
(74) *Attorney, Agent, or Firm* — Barlow, Josephs & Holmes, Ltd.

(57) ABSTRACT

A microwave cooking system is described for use in cooking pasta and alike in a microwave oven. The microwave cooking system includes a base receptacle, a colander, and a ventilation cover. The colander is sized to be suspended and nested within a central cavity of the base receptacle. The ventilation cover is sized to mount on top of the colander. An optional storage lid may be included for use in sealably engaging onto the base receptacle in which the colander and the ventilation cover can be nested within the base receptacle sealed with the storage lid. The method includes the steps of affixing, cooking, filling, heating, obtaining, placing, removing, and repositioning.

3 Claims, 5 Drawing Sheets

MICROWAVE COOKING SYSTEM

FIELD OF THE INVENTION

The present invention relates to cooking accessories, more particularly to a microwave cooking system for use in conveniently pasta dishes in the microwave oven.

DESCRIPTION OF THE PRIOR ART

A wide variety of cooking systems is currently available on the commercial market and an even larger number of these types of systems are known in the art of cooking systems, for example the insulated dish and lid for microwave cooking disclosed by Haverland Jr, et al. in U.S. Pat. No. 4,478,349; the food receptacle for microwave cooking disclosed by Seiferth in U.S. Pat. No. 4,641,005; the microwave cooking and serving dish disclosed by Mason, Jr. in U.S. Pat. No. 4,892,213; the vented food cooking system for microwave ovens disclosed by Berkoff in U.S. Pat. No. 5,387,781; the microwave steam cooking apparatus disclosed by Tsai in U.S. Pat. No. 5,558,798; a the microwave cooking vessel with removable food support and storage clip disclosed by Fleck et al. in U.S. Pat. No. 5,837,979; and the microwave cooking tray with multiple floor patterns disclosed by Hopkins, Sr. in U.S. Pat. No. 7,141,771.

While all of the above-described systems fulfill their respective, particular objectives and requirements, the aforementioned patents do not describe a microwave cooking system having a colander and a ventilation cover sized to nest within a base receptacle when a storage lid sealably engaged with the base receptacle. This combination of elements would specifically match the user's particular individual needs of making it possible to provide a means for efficient use and storage of a microwave cooking device. The above-described patents make no provision for a microwave cooking system having a colander and a ventilation cover sized to nest within a base receptacle when a storage lid sealably engaged with the base receptacle.

Therefore, a need exists for a new and improved microwave cooking system having a colander and a ventilation cover sized to nest within a base receptacle when a storage lid sealably engaged with the base receptacle. In this respect, the microwave cooking system according to the present invention substantially departs from the conventional concepts and designs of the prior art, and in doing so provides an apparatus primarily developed for the purpose of providing a convenient means for making it possible to efficiently use and to hygienically store the microwave cooking system when the microwave cooking system is not in use.

SUMMARY OF THE INVENTION

The present microwave cooking system and method of using same, according to the principles of the present invention, overcomes a number of the shortcomings of the prior art by providing a novel microwave cooking system and a method for use same for cooking a variety of pasta like dishes in the microwave. The system includes a base receptacle, a colander, and a ventilation cover. The colander is sized to be suspended and nested within a central cavity of the base receptacle. The ventilation cover is sized to mount on top of the colander. The method includes the steps of affixing, cooking, filling, heating, obtaining, placing, removing, and repositioning.

In view of the foregoing disadvantages inherent in the known type microwave cooking systems now present in the prior art, the present invention provides an improved microwave cooking system, which will be described subsequently in great detail, is to provide a new and improved microwave cooking system which is not anticipated, rendered obvious, suggested, or even implied by the prior art, either alone or in any combination thereof.

To attain this, the present invention essentially comprises a base receptacle, a colander, and a ventilation cover. The colander is sized to be suspended and nested within a central cavity of the base receptacle. The ventilation cover is sized to mount on top of the colander. An optional storage lid may be included for use in sealably engaging onto the base receptacle in which the colander and the ventilation cover can be nested within the base receptacle sealed with the storage lid. The method includes the steps of affixing, cooking, filling, heating, obtaining, placing, removing, and repositioning.

There has thus been outlined, rather broadly, the more important features of the invention in order that the detailed description thereof that follows may be better understood, and in order that the present contribution of the art may be better appreciated.

The invention may also include, inter alia, an optional storage lid adapted to sealably engage onto the base receptacle.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an aspect of the present invention to provide a new and improved microwave cooking system that has many of the advantages of the prior cooking systems and minimizing a number of their disadvantages.

It is another aspect of the present invention to provide a new and improved microwave cooking system that may be easily and efficiently manufactured and marketed.

An even further aspect of the present invention is to provide a new and improved microwave cooking system that has a low cost of manufacture with regard to both materials and labor, and which accordingly is then susceptible of low prices of sale to the consuming public, thereby making microwave cooking system economically available to the buying public.

Still another aspect of the present invention is to provide a microwave cooking system that provides in the apparatuses and methods of the prior art some of the advantages thereof, while simultaneously overcoming some of the disadvantages normally associated therewith.

Even still another aspect of the present invention is to provide a microwave cooking system having a colander sized to be suspended and nested within a base receptacle.

Still another aspect of the present invention is to provide a microwave cooking system having a ventilation cover have at least one steam vent in which the cover is sized to mount on top of the colander of the microwave cooking system.

Lastly, it is an object of the present invention to provide a new and improved method of using comprising the steps of affixing, cooking, filling, heating, obtaining, placing, removing, and repositioning.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
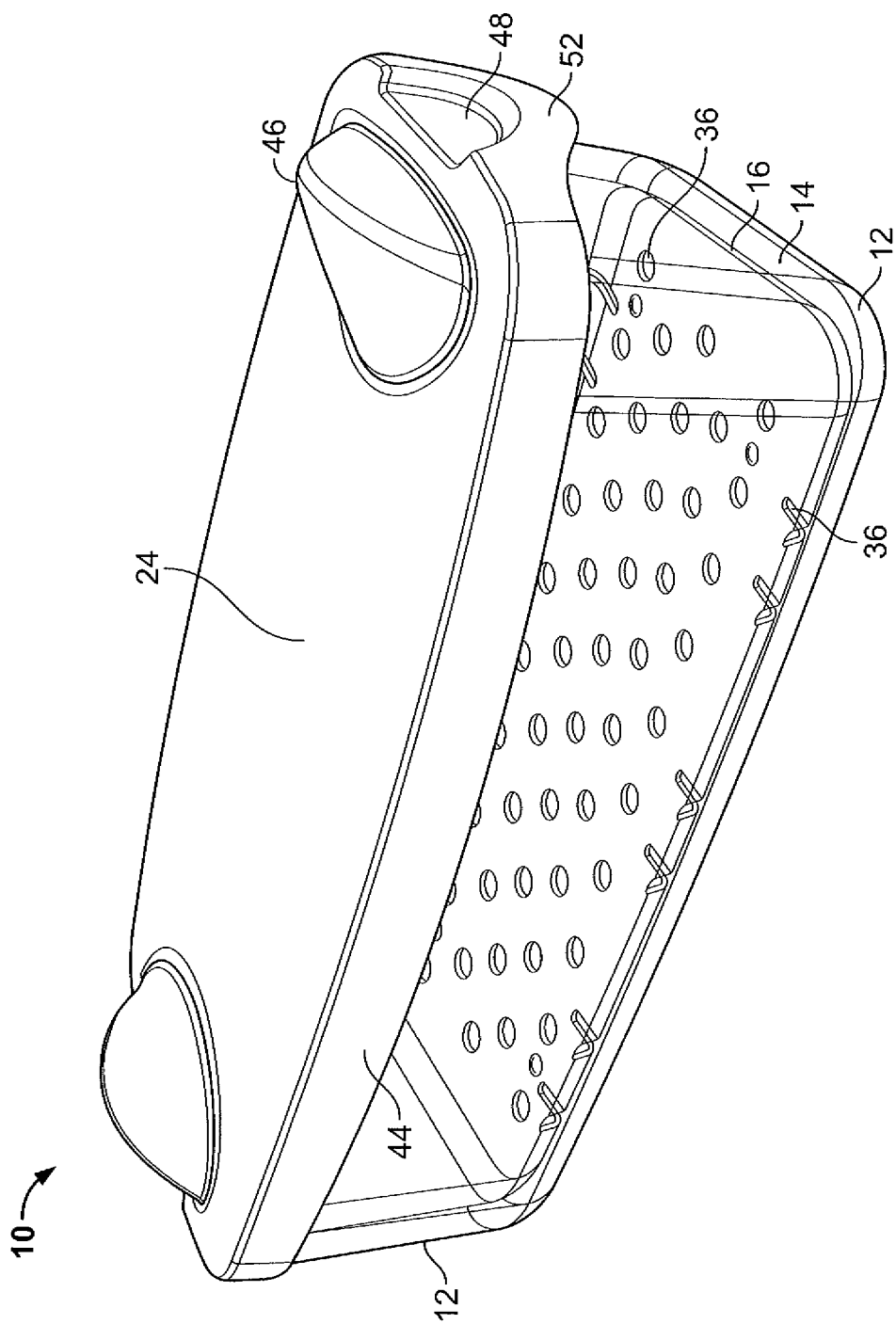
FIG. 1 is a perspective view of an embodiment of the microwave cooking system constructed in accordance with the principles of the present invention.

Referring now to the drawings, and in particular FIGS. 1 to 5 thereof, one preferred embodiment of the present invention is shown and generally designated by the reference numeral 10. One preferred embodiment of the microwave cooking system 10 comprises: a base receptacle 12, a colander 16, and ventilation cover 20. The base receptacle 12 is shaped to have a centrally disposed cavity 14. The colander 16 having an opening 18 in which the colander 16 is sized to be suspended within the central cavity 14 of the base receptacle 12 when the colander 16 is nested within the base receptacle 12. The ventilation cover 20 has at least one steam vent 22 in which the ventilation cover 20 is sized to mount on top of the colander 16 when the ventilation cover 20 is positioned over the opening 18 of the colander 16.

The colander 16 and the ventilation cover 20 are sized to nest within the storage lid 24 and base receptacle 12 when the storage lid 24 and the base receptacle 12 are sealably engaged together.

The base receptacle 12 may have a collar 28 surrounding the centrally disposed cavity 14 of the base receptacle 12 in which the collar 28 is sized to form an annular skirt 30. Also the base receptacle 12 has an annular channel 32 traversing around the centrally disposed cavity 14 of the base receptacle 12. The base receptacle 12 also has a pair of under-hanging hemispherical crescent shaped handholds 34.

The colander 16 may have a plurality of apertures 36 in a lower portion of the colander 16, a pair of overhangs 38 along an upper portion of the colander 16, and a pair of finger grips 40 along the upper portion of the colander 16.

The ventilation cover 20 may have a pair of under-hanging flanges 42 sized to nest within the opening 18 of the colander 16. The ventilation cover 20 may also having a pair of steam vents 22 in which each steam vent 22 sized to have a hemispherical crescent shape.

The storage lid 24 may have an under-hanging perimeter skirt 44 around the storage lid 24, a pair of protuberances 46 in which each protuberance 46 having a hemispherical crescent shape, and a pair of thumb grips 48 in which each thumb grip 48 having an indented crescent shape.

The perimeter skirt 44 of the storage lid 24 may be sized to have a pair of hand grips 52 in which each hand grip 52 having a crescent shape. Also the storage lid 24 may have an underlying annular ridge 50 around the storage lid 24 in which the underlying annular ridge 50 of the storage lid 24 and the annular channel 32 of the collar 28 of the base receptacle 12 are mutually sized to sealably engage with each other.

The storage lid 24 may also have an under-hanging perimeter skirt 44 around the storage lid 24 and the base receptacle 12 have also have a collar 28 surrounding the centrally disposed cavity 14 of the base receptacle 12 in which the collar 28 is sized to form an annular skirt 30 so that the annular skirt 30 is sized to nest within the collar 28.

An optional storage lid 24 may be added to the microwave cooking system 10 in which the optional storage lid 24 is adapted to sealably engage onto the base receptacle 12.

An optional meniscus line 26 may be added to the microwave cooking system 10 in which the optional meniscus line 26 is marked around a portion of the base receptacle 12.

Another preferred embodiment of the microwave cooking system 10 comprises a base receptacle 12, a colander 16, a ventilation cover 20, a storage lid 24, and a meniscus line 26. The base receptacle 12 has a centrally disposed cavity 14, a collar 28, an annular skirt 30, and an annular channel 32, and a pair of handholds 34. The collar 28 surrounds the centrally disposed cavity 14 of the base receptacle 12 and the collar 28 is sized to form an annular skirt 30. The annular channel 32 traverses around the centrally disposed cavity 14 of the base receptacle 12. The pair of handholds 34 are hemispherical crescent shaped under-hanging handholds 34. The colander 16 has an opening 18, a plurality of aperture 36s, a pair of overhangs 38, and a pair of finger grips 40. The plurality of apertures 36 of the colander 16 are in a lower portion of the colander 16. The pair of overhangs 38 of the colander 16 along an upper portion of the colander 16. The pair of finger grips 40 of the colander 16 are on an upper portion of the colander 16. The colander 16 is sized to be suspended within the central cavity 14 of the base receptacle 12 when the colander 16 is nested within the base receptacle 12. The ventilation cover 20 has at least one steam vent, at a pair of steam vent, a pair of under-hanging flanges 42. The pair of under-hanging flanges 42 are sized to nest within the opening 18 of the colander 16. The pair of steam vents 22 are sized to have a hemispherical crescent shape. The ventilation cover 20 is sized to mount on top of the colander 16 when the ventilation cover 20 is positioned over the opening 18 of the colander 16. The storage lid 24 has a skirt, a pair of protuberances 46, and a pair of thumb grips 48. The skirt is an under-hanging perimeter skirt 44 around the storage lid 24. Each of the protuberances 46 have a hemispherical crescent shape. Each thumb grip 48 has an indented crescent shape. The perimeter skirt 44 of the storage lid 24 is sized to have a pair of hand grips 52 in which each hand grip 52 has a crescent shape. The storage lid 24 is adapted to sealably engage onto the base receptacle 12 of the microwave cooking system 10. The storage lid 24 has an underlying annular ridge 50 around the storage lid 24 in which the underlying annular ridge 50 of the storage lid 24 and the annular channel 32 of the collar 28 of the base receptacle 12 are mutually sized to sealably engage with each other. Finally, the meniscus line 26 is marked around a portion of the base receptacle 12.

A method of using a microwave cooking system 10 comprising the steps of affixing, cooking, filling, heating, obtaining, placing, removing, and repositioning. The obtaining step comprises obtaining a base receptacle 12 having a centrally disposed cavity 14, wherein the base receptacle 12 having a collar 28 surrounding the centrally disposed cavity 14 of the base receptacle 12 in which the collar 28 sized to form an annular skirt 30, an annular channel 32 traversing around the centrally disposed cavity 14 of the base receptacle 12, and a pair of under-hanging hemispherical crescent shaped handholds 34; a colander 16 having an opening 18, a plurality of apertures 36 in a lower portion of the colander 16, a pair of overhangs 38 along an upper portion of the colander 16, and a pair of finger grips 40, wherein the colander 16 sized to be suspended within the central cavity 14 of the base receptacle 12 when the colander 16 is nested within the base receptacle 12; a ventilation cover 20 having at least one steam vent, a pair of under-hanging flanges 42 sized to nest within the opening 18 of the colander 16, a pair of steam vents 22 in which each steam vent 22 sized to have a hemispherical crescent shape, wherein the ventilation cover 20 sized to mount on top of the colander 16 when the ventilation cover 20 is positioned over the opening 18 of the colander 16; a storage lid 24 having an under-hanging perimeter skirt 44 around the storage lid 24, a pair of protuberances 46 in which each protuberance 46 having a hemispherical crescent shape, a pair of thumb grips 48 in which each thumb grip 48 having an indented crescent shape, wherein the perimeter skirt 44 of the storage lid 24 sized to have a pair of hand grips 52 in which each hand grip 52 having a crescent shape, wherein the storage lid 24 adapted to sealably engage onto the base receptacle 12 of the microwave cooking system 10, wherein the storage lid 24 having an underlying annular ridge 50 around the storage lid 24 in which the underlying annular ridge 50 of the storage lid 24 and the annular channel 32 of the collar 28 of the base receptacle 12 are mutually sized to sealably engage with each other; and a meniscus line 26 marked around a portion of the base receptacle 12. The filling step comprises filling the base receptacle 12 with water up to the meniscus line 26. The nesting step comprises nesting the colander 16 into the centrally disposed cavity 14 of the base receptacle 12. The affixing step comprises affixing the ventilation cover 20 on top of the nested colander 16. The step comprises heating with microwave radiation the water in the base receptacle 12 until the water is heated at or near a boiling temperature. The removing step comprises removing the affixed ventilation cover 20 away from the nested colander 16. The placing step comprises placing a portion of pasta into the nested colander 16. The repositioning step comprises repositioning the ventilation cover 20 over the nested colander 16 containing the portion of pasta. The cooking step comprises cooking the portion of pasta placed in the nested colander 16 with the repositioned ventilation cover 20.

An optional set of steps may be added to the method including the steps of aliquoting and pouring. The aliquoting step comprises aliquoting a dash of salt into the water in the base receptacle 12. The pouring step comprises pouring a portion of oil into the water in the base receptacle 12.

Yet another optional set of steps may be added to the method including the steps of dispensing, draining, extricating, and lifting. The extricating step comprises extricating the repositioned ventilation cover 20 away from the nested colander 16. The lifting step comprises lifting the nested colander 16 away from the base receptacle 12 after the portion of pasta is cooked. The draining step comprises draining the cooked portion of pasta in the colander 16. The dispensing step comprises dispensing cold water over the drained portion of pasta in the colander 16.

Still yet optional set of steps may be added to the method including the steps of cleaning, drying, mating, and storing. The cleaning step comprises cleaning the lid 24, the base receptacle 12 and the colander 16 with soap and water. The drying step comprises drying the lid 24, the base receptacle 12 and the colander 16. The mating step comprises mating together the base receptacle 12, the colander 16, the ventilation cover 20 and the storage lid 24 into a mated together microwave cooking system 10. The storing step comprises storing the mated together microwave cooking system 10.

Referring now to FIG. 1 which depicts a perspective view of an embodiment of the microwave cooking system 10 showing the base receptacle 12, the colander 16, and the storage lid 24. The base receptacle 12 is shown having a centrally disposed cavity 14. The colander 16 is shown suspended within the central cavity 14 of the base receptacle 12 when the colander 16 is nested within the base receptacle 12. The colander 16 and the ventilation cover 20 (not shown) are shown sized to nest within the storage lid 24 and base receptacle 12 when the storage lid 24 and the base receptacle 12 are sealably engaged together. The colander 16 is shown having a plurality of apertures 36 in a lower portion of the colander 16. The storage lid 24 is shown having an under-hanging perimeter skirt 44, a pair of protuberances 46 in which each protuberance 46 is shown having a hemispherical crescent shape, and a pair of thumb grips 48 is shown having an indented crescent shape. The perimeter skirt 44 of the storage lid 24 is also shown to be sized to have a pair of hand grips 52 in which each hand grip 52 having a crescent shape. Also shown are the base receptacle 12 and the storage lid 24 mutually sized to sealably engage with each other.

Figure 2:
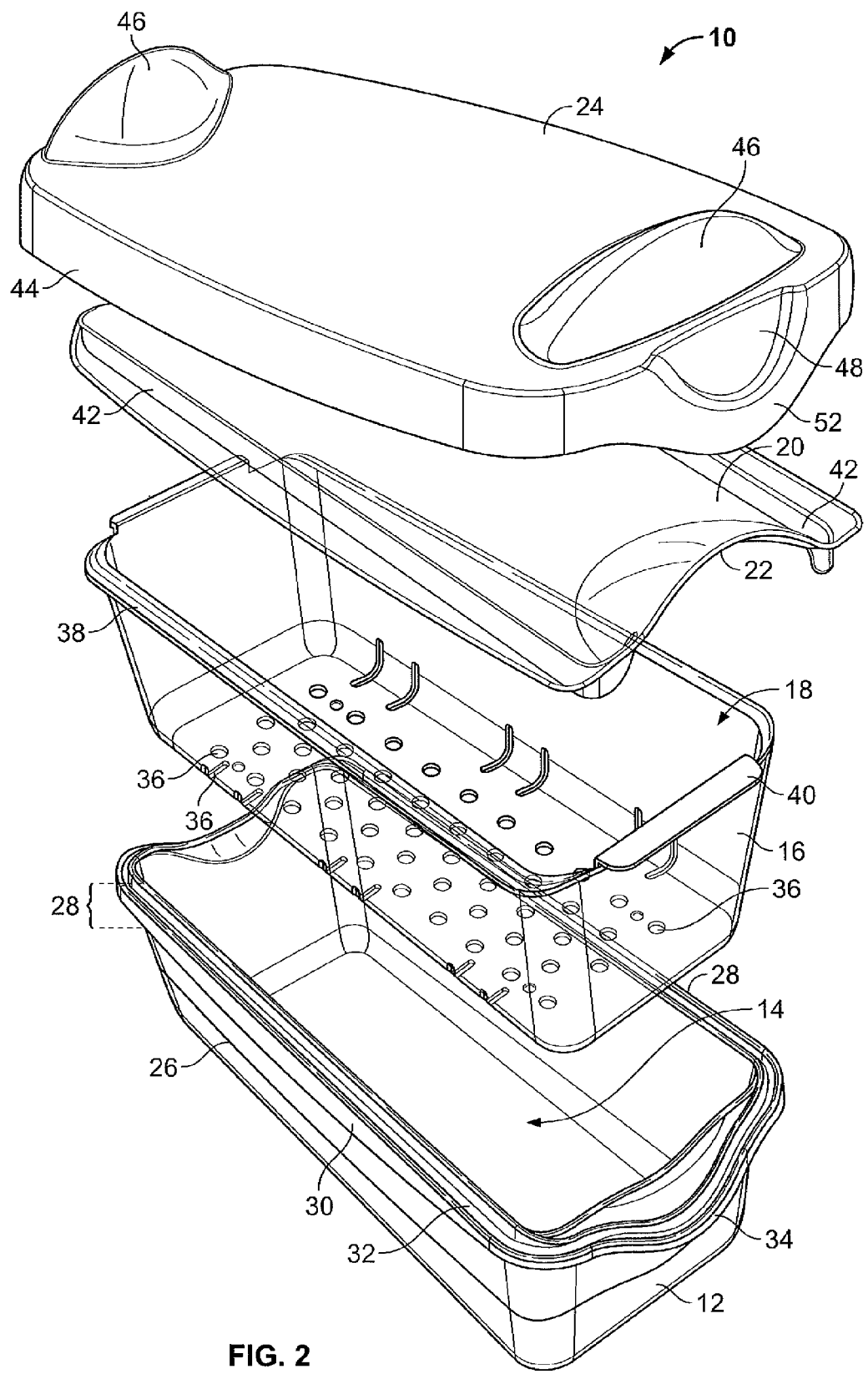
FIG. 2 is a an exploded perspective view of the microwave cooking system of the present invention.

Referring now to FIG. 2 which depicts an exploded perspective view of the microwave cooking system 10 showing the base receptacle 12, the colander 16, the ventilation cover 20, and the storage lid 24. The base receptacle 12 is shown shaped to have a centrally disposed cavity 14 in which the colander 16 is sized to be suspended within the central cavity 14 of the base receptacle 12 when the colander 16 is shown capable of being nested within the central cavity 14 of base receptacle 12. The ventilation cover 20 is shown having at least one steam vent 22 in which the ventilation cover 20 is shown sized to mount on top of the colander 16 when the ventilation cover 20 is positioned over the opening 18 of the colander 16. Both the colander 16 and the ventilation cover 20 are shown to capable of being nested within the central cavity 14 of the base receptacle 12 when the storage lid 24 and the base receptacle 12 are sealably engaged together. The base receptacle 12 is shown having a collar 28 surrounding the centrally disposed cavity 14 of the base receptacle 12 in which the collar 28 is shown sized to form an annular skirt 30. Also shown in the base receptacle 12 is an annular channel 32 traversing around the centrally disposed cavity 14 of the base receptacle 12. Finally, a pair of under-hanging hemispherical crescent shaped handholds 34 are shown. The colander 16 is shown having a plurality of apertures 36 in a lower portion of the colander 16, a pair of overhangs 38 along an upper portion of the colander 16, and a pair of finger grips 40 along the upper portion of the colander 16. The ventilation cover 20 is shown have a pair of under-hanging flanges 42 sized to nest within the opening 18 of the colander 16. The ventilation cover 20 may also having a pair of steam vents 22 in which each steam vent 22 sized to have a hemispherical crescent shape. The storage lid 24 is shown having an under-hanging perimeter skirt 44 around the storage lid 24, a pair of protuberances 46, and a pair of thumb grips 48 in which each thumb grip 48 having an indented crescent shape. The perimeter skirt is shown sized to have a pair of hand grips 52.

Figure 3:
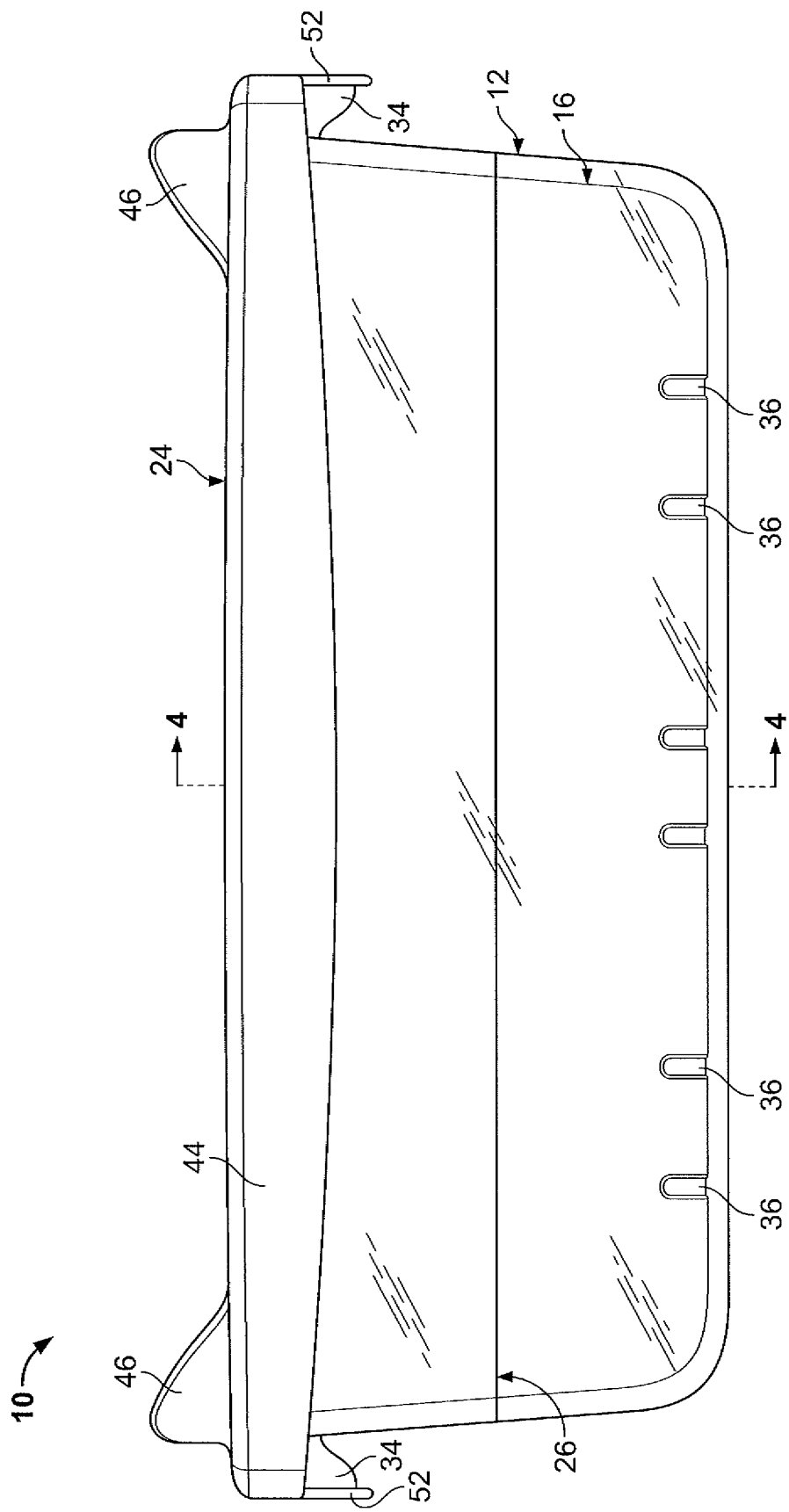
FIG. 3 is a lengthwise view of the microwave cooking system of the present invention.

Referring now to FIG. 3 which depicts a lengthwise view of the microwave cooking system 10 showing the base receptacle 12, the colander 16, and the storage lid 24. The base receptacle 12 is shown having a centrally disposed cavity 14. The colander 16 is shown suspended within the base receptacle 12 when the colander 16 is nested within the base receptacle 12. The colander 16 and the ventilation cover 20 (not shown) are shown sized to nest within the storage lid 24 and base receptacle 12 when the storage lid 24 and the base receptacle 12 are sealably engaged together. The colander 16 is shown having a plurality of apertures 36 in a lower portion of the colander 16. The storage lid 24 is shown having an under-hanging perimeter skirt 44, a pair of protuberances 46 in which each protuberance 46. The perimeter skirt 44 of the storage lid 24 is also shown to be sized to have a pair of hand grips 52 in which each hand grip 52. The base receptacle 12 is shown having a pair of under-hanging hemispherical crescent shaped handholds 34. A meniscus line 26 is also shown marked around a portion of the base receptacle 12.

Figure 4:
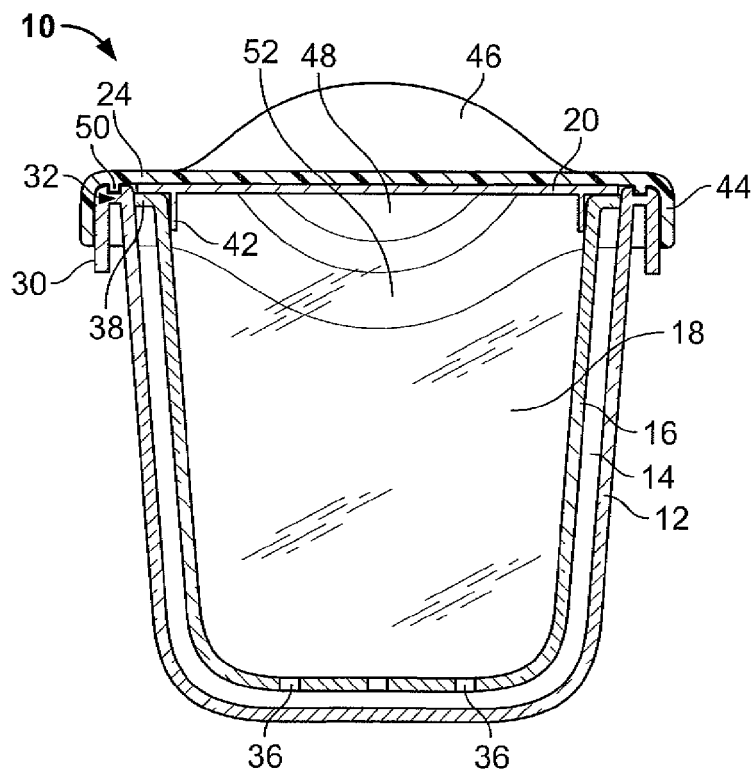
FIG. 4 is a cross sectional side view microwave cooking system of the present invention.

Referring now to FIG. 4 is a cross sectional side view microwave cooking system 10 the base receptacle 12, the colander 16, the ventilation cover 20, and the storage lid 24. The base receptacle 12 is shown having a centrally disposed cavity 14 in which the colander 16 and the ventilation cover 20 are shown nested within the base receptacle 12 when the base receptacle 12 and the storage lid 24 are sealably engaged with each other. The colander 16 is shown having a plurality of apertures 36 in a lower portion of the colander 16, a pair of overhangs 38 along an upper portion of the colander 16. The ventilation cover 20 is shown having a pair of under-hanging flanges 42 sized to nest within the opening 18 of the colander 16. The storage lid 24 is shown having an under-hanging perimeter skirt 44, a protuberance 46, and a thumb grip 48 and a hand grip 52. An underlying annular ridge 50 in the storage lid 24 is shown in which the underlying annular ridge 50 of the storage lid 24 and the annular channel 32 of the collar 28 of the base receptacle 12 are shown mutually sized to sealably engage with each other.

Figure 5:
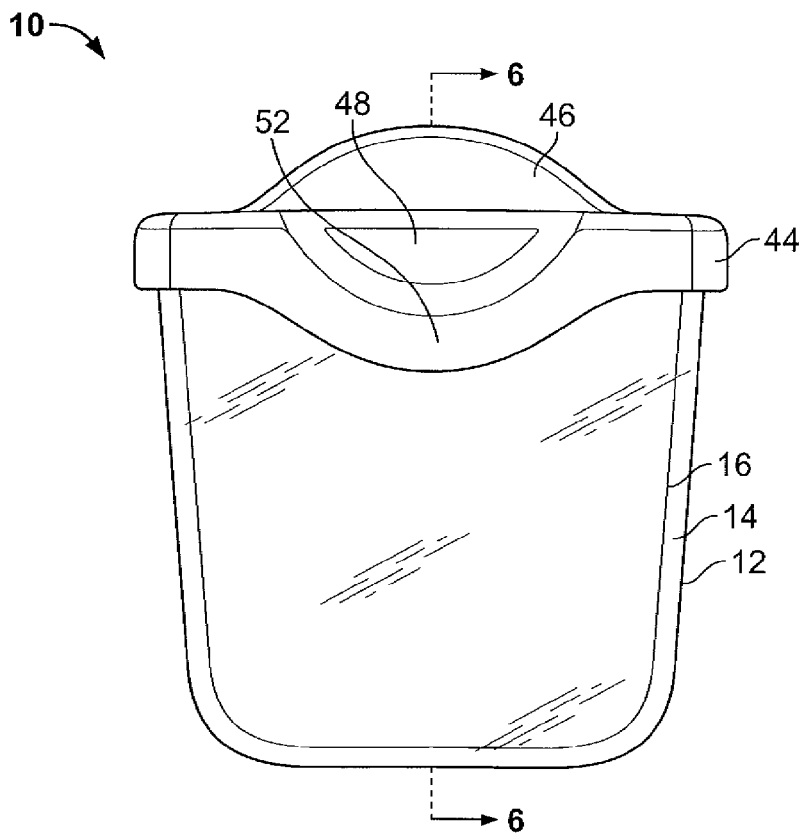
FIG. 5 is a side view of the microwave cooking system of the present invention.

Referring now to FIG. 5 is a side view of the microwave cooking system 10 showing the base receptacle 12, the colander 16, and the storage lid 24. The base receptacle 12 is shown having a centrally disposed cavity 14 with the colander 16 suspended and nested within the central cavity 14. The storage lid 24 is shown having an under-hanging perimeter skirt 44 around the storage lid 24, a protuberance 46, a thumb grip 48 and a hand grip 52.

Figure 6:
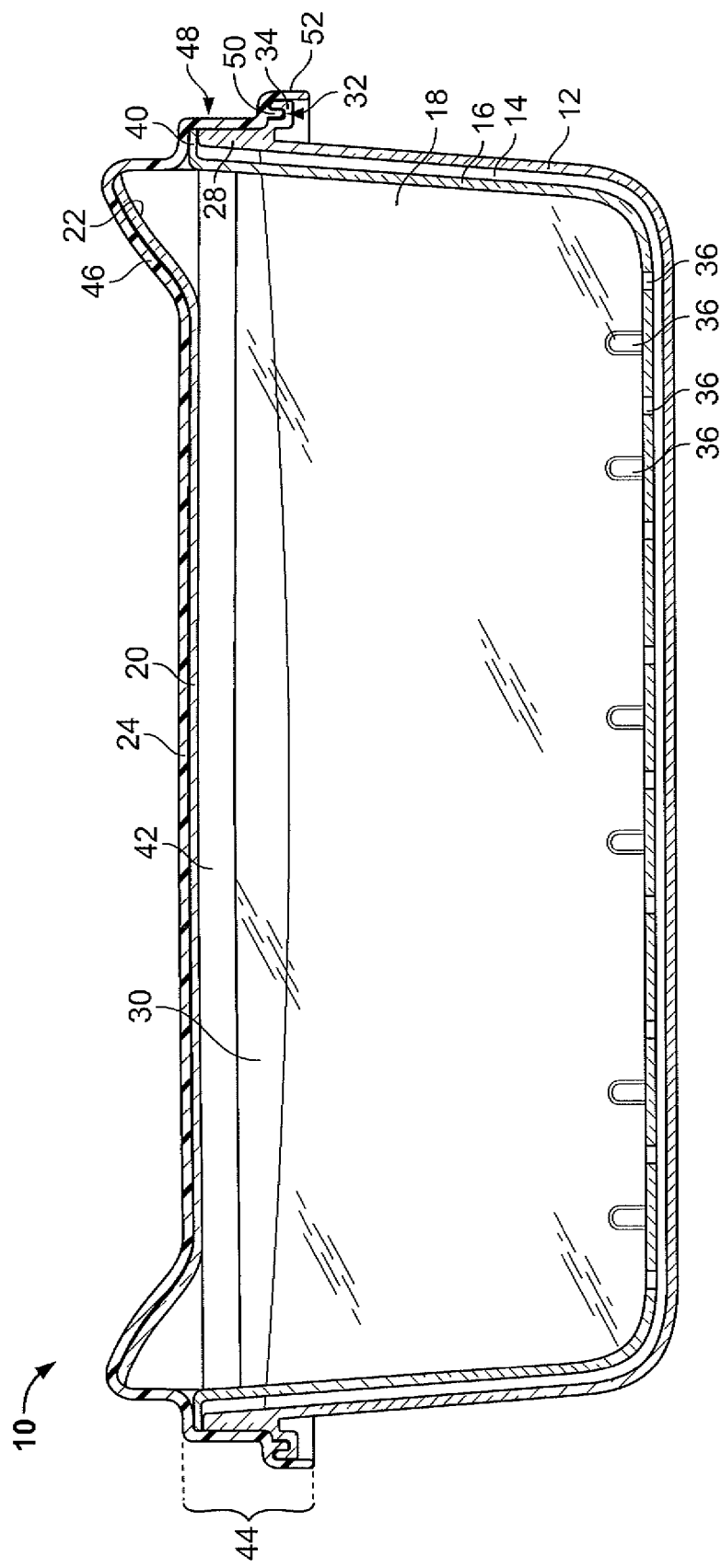
FIG. 6 is a lengthwise cross sectional view of the microwave cooking system of the present invention.

Referring now to FIG. 6 which depicts a lengthwise cross sectional view of the microwave cooking system 10 the base receptacle 12, the colander 16, the ventilation cover 20, and the storage lid 24. The base receptacle 12 is shown having a centrally disposed cavity 14 in which the colander 16 and the ventilation cover 20 are shown nested within the base receptacle 12 when the base receptacle 12 and the storage lid 24 are sealably engaged with each other. The colander 16 is shown having a plurality of apertures 36 in a lower portion of the colander 16. The ventilation cover 20 is shown having an under-hanging flange 42 sized to nest within the colander 16. The storage lid 24 is shown having an under-hanging perimeter skirt 44, a pair of protuberances 46, and a thumb grip 48 and a hand grip 52. The underlying annular ridge 50 in the storage lid 24 and the annular channel 32 of the collar 28 of the base receptacle 12 are shown mutually sized to sealably engage with each other.

As to the manner of usage and operation of the present invention, the same should be apparent from the above description. Accordingly, no further discussion relating to the manner of usage and operation will be provided.

While a preferred embodiment of the microwave cooking system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modification which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A microwave cooking system comprising:
   a base receptacle having a centrally disposed cavity, wherein the base receptacle having
   a collar surrounding the centrally disposed cavity of the base receptacle in which the collar sized to form an annular skirt,
   an annular channel traversing around the centrally disposed cavity of the base receptacle, and
   a pair of under-hanging hemispherical crescent shaped handholds;
   a colander having
      an opening,
      a plurality of apertures in a lower portion of the colander,
      a pair of overhangs along an upper portion of the colander, and
      a pair of finger grips, wherein
         the colander sized to be suspended within the central cavity of the base receptacle
         when the colander is nested within the base receptacle;
   a ventilation cover having
      at least one steam vent,
      a pair of under-hanging flanges sized to nest within the opening of the colander,
      a pair of steam vents in which each steam vent sized to have a hemispherical crescent shape, wherein
         the ventilation cover sized to mount on top of the colander when the ventilation cover is positioned over the opening of the colander;
   a storage lid having an under-hanging perimeter skirt around the storage lid, a pair of protuberances in which each protuberance having a hemispherical crescent shape, a pair of thumb grips in which each thumb grip having an indented crescent shape, wherein the perimeter skirt of the storage lid sized to have a pair of hand grips in which each hand grip having a crescent shape, wherein the storage lid adapted to sealably engage onto the base receptacle of the microwave cooking system, the storage lid having an underlying annular ridge around the storage lid in which the underlying annular ridge of the storage lid and the annular channel of the collar of the base receptacle are mutually sized to sealably engage with each other; and a meniscus line marked around a portion of the base receptacle.

2. A microwave cooking system comprising:
   a base receptacle having a centrally disposed cavity;
   a colander having an opening, the opening sized to be suspended within the central cavity of the base receptacle when the colander is nested within the base receptacle;
   a ventilation cover having at least one steam vent, the ventilation cover sized to mount on top of the colander when the ventilation cover is positioned over the opening of the colander; and
   a storage lid adapted to sealably engage onto the base receptacle; the storage lid having an under-hanging perimeter skirt around the storage lid,
   a pair of protuberances in which each protuberance has a hemispherical crescent shape; and
   a pair of thumb grips in which each thumb grip has an intended crescent shape.

3. The system of claim 2 wherein the perimeter skirt of the storage lid is sized to have a pair of hand grips in which each handgrip has a crescent shape.

* * * * *